Feb. 1, 1927.

L. M. ELLISON 1,616,033

DRAFT GAUGE

Filed July 10, 1922

Witnesses

Inventor
Lewis M. Ellison
by
Atty.

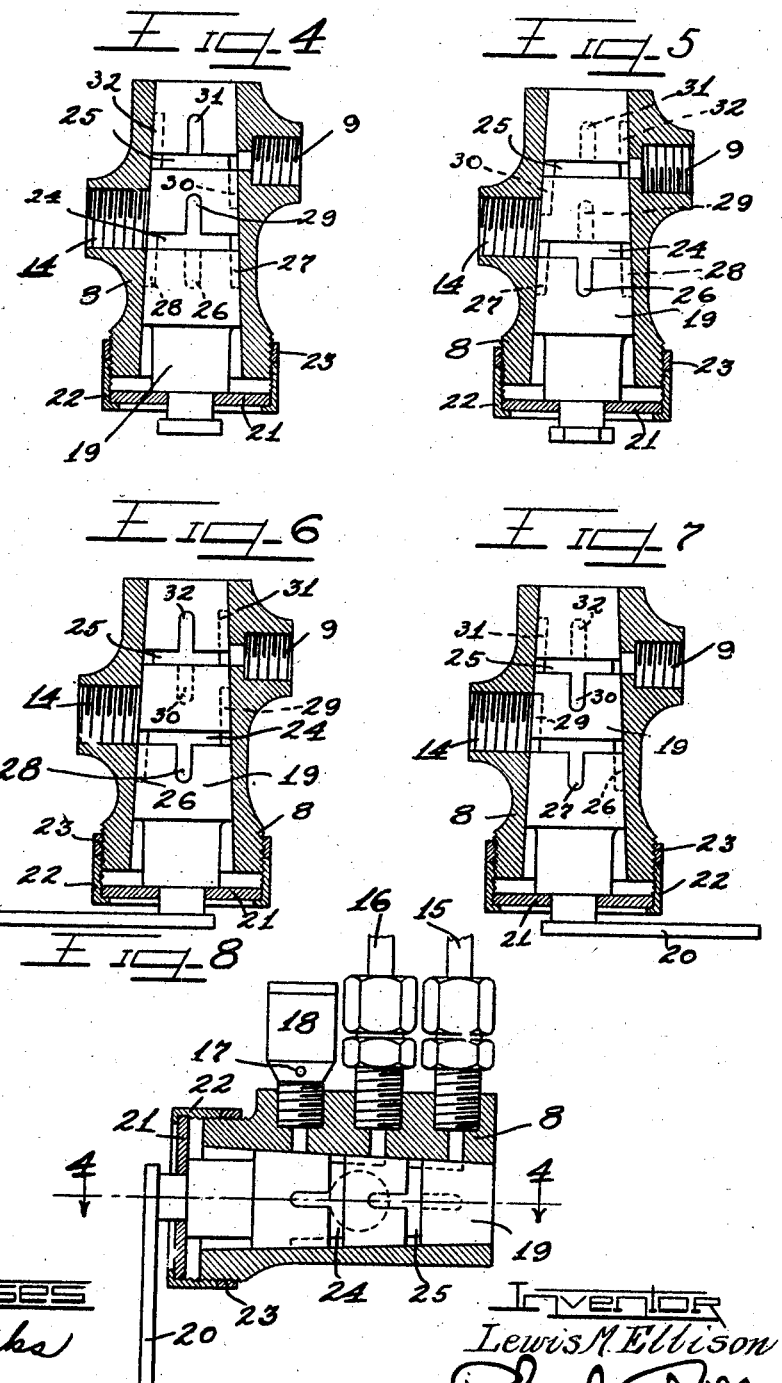

Patented Feb. 1, 1927.

1,616,033

UNITED STATES PATENT OFFICE.

LEWIS M. ELLISON, OF CHICAGO, ILLINOIS.

DRAFT GAUGE.

Application filed July 10, 1922. Serial No. 573,968.

This invention relates to a draft gauge for furnaces of that type which is designed to indicate the pressure in the furnace box, flue or other part, or the differences between said pressures.

This invention, however, concerns itself primarily with a novel form of valve mechanism whereby the fire box and flues may successively be brought into communication with the gauge, or may simultaneously be brought into communication therewith and in which both the furnace and flue may be cut off from the gauge and air admitted to both ends of the gauge.

This invention comprises the novel mechanism hereinafter described and more particularly pointed out and defined in the appended claims.

In the accompanying drawings, which illustrate a preferred embodiment of this invention, and in which similar reference numerals refer to similar features in the different views:

Figures 4, 5, 6 and 7 are enlarged horizontal sections through the valve housing illustrating the positions of the valve in its different adjustments taken substantially on the line 4—4 of Figure 8.

Figure 8 is a vertical section through the valve housing upon an enlarged scale.

As shown on the drawings:

Figure 1:
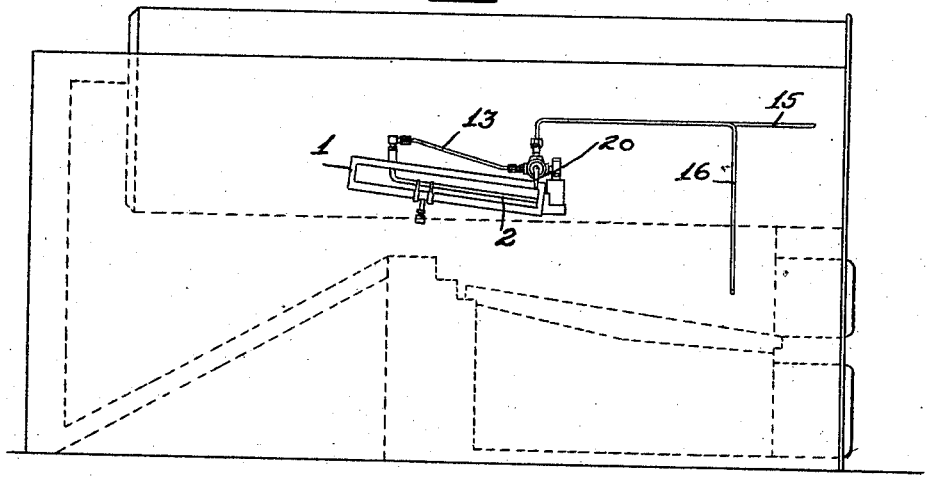
Figure 1 is an elevational view of a furnace with my invention applied thereto.
Figure 2:
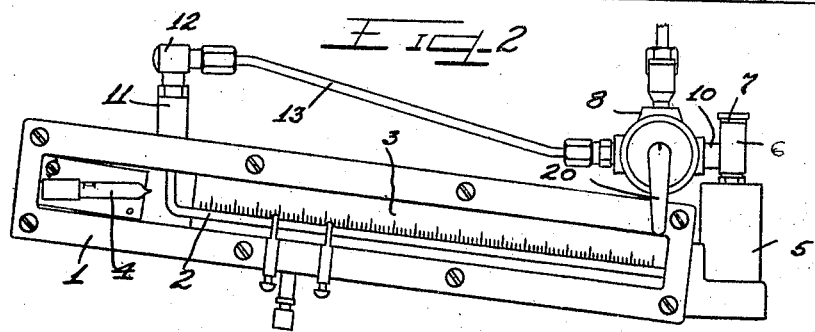
Figure 2 is an elevational view of the gauge upon an enlarged scale.
Figure 3:
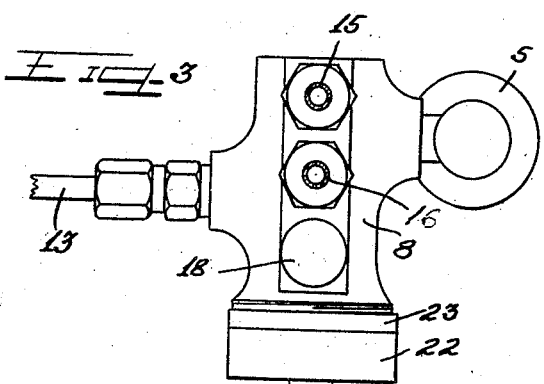
Figure 3 is a top plan view of the valve housing with the furnace and flue pipes shown in section upon an enlarged scale.

In referring now to the drawing, it will be observed that there is illustrated in Figure 1 an ordinary furnace to which my improved draft gauge is applied. The gauge illustrated consists of a frame 1 which supports the indicator which in the present instance consists of a glass tube 2 or the like for receiving a mobile liquid. A scale 3 coextensive with the liquid tube is also adapted to be supported by the frame for indicating or reading the pressures or movements of the liquid. The gauge is adapted to be properly adjusted in an inclined position by means of a spirit level 4 when mounted.

The indicating tube 2 communicates at one end with a liquid containing vessel 5, being cemented in the wall thereof. The liquid containing vessel 5 is supported by the frame 1, and a coupling 6 is secured upon the upper end thereof, which coupling is provided with a removable screw cap 7 or the like for admitting liquid to the vessel 5. The coupling 6 is designed to support a valve housing 8 which is preferably provided with a screw threaded opening or aperture 9 having a part leading to the valve chamber.

The horizontal hollow arm 10 of the coupling is screwed in the aperture 9. Thus communication from the valve housing 8 to the indicator is provided through the coupling 6 and vessel 5. The opposite end of the indicator tube 2 is cemented or sealed in the bottom of a tubular member 11 which is closed at its upper end by a coupling 12 providing thereby an air tight chamber in the member 11. A pipe 13 coupled to the housing 8 by means of a coupling screwed in an aperture 14 in said housing is connected to the coupling 12, so that both ends of the indicator tube are in communication with the valve housing 8.

A flue pipe 15 leading from the flue of the furnace enters the top of the valve housing 8 and a furnace pipe 16 leading from the fire box or furnace likewise enters the top of the housing 8 adjacent the pipe 15. The top of the valve housing is also provided with an air vent 17 (Figure 8) which is formed in a filter or air cup 18 screwed in the wall of the valve housing. The pipes 15 and 16 and air cup 18 communicate with the interior of the valve housing through suitable ports as shown in Figure 8.

A rotary valve 19 of tapering form is fitted within the valve housing 8 and is operable by means of a handle 20 secured to the valve exterior of the housing. The valve 19 is held in position within the housing by means of an end washer 21 which fits against an annular shoulder formed by a reduced end portion of the valve, the washer 21 being urged inwardly and retained in position by the cap 22 which is adjustably screw threaded to the housing, and which has a radial lip or flange engaging the margins of the washer. A lock nut 23 may be applied to the threaded portion of the housing interiorly of the cap 22 for locking the same against unscrewing.

The valve member 19 is provided with a pair of circular grooves 24 and 25, in its periphery, the former of which is adapted to communicate with the aperture 14 and pipe 13 secured therein, and the latter communicates with the aperture 9 and the vessel 5 which connects with the housing through said aperture. It will be noted that the furnace pipe and flue pipe and the air cup enter the top of the housing 8, and they are adapted to be brought into communication with the grooves 24 and 25 at various times or positions of the valve 19 through staggered ports or ducts formed by cutting longitudinal grooves in the periphery of the valve member. Thus the air cup communicates with groove 24 through the ducts 26 and 27 and 28 as shown in Figs. 5, 6 and 7. The furnace pipe 16 communicates with groove 24 through duct 29 and with groove 25 through duct 30. The flue pipe communicates with groove 25 through ducts 31 and 32.

The arrangement of the ducts is such that when the valve member 19 is in the position shown in Figure 5, the pipes 15 and 16 are shut off and are not in communication with the indicator tube, but the air cup having the air vent therein is in communication with the groove 24 which is in communication with the aperture 14; and the aperture 14 is in communication with duct 30 which leads to groove 25 which in turn communicates with aperture 9. Since aperture 14 leads to the left hand end of the indicator tube and aperture 9 leads to the right hand end of the indicator tube, the liquid in the tube is balanced by equal atmospheric pressure at both ends, and the gauge can readily be set or properly adjusted without interference of the furnace or flue pressures. This is an important feature in the valve construction, since it makes possible the use of a single valve where several had been used before, and greatly simplifies the structure, operation and adjustments of the gauge.

Now, if it is desired to determine the pressure or draft in the flue, the valve handle 20 is turned 90° from the position shown in Figure 5, bringing the valve into the position shown in Figure 6 in which the flue pipe 15 communicates with duct 32 which leads to the groove 25 which communicates with aperture 9 and the right hand end of the indicator tube, and the air vent communicates with the left hand end of the indicator tube through duct 28, groove 24 and pipe line 13, the furnace pipe 16 being cut off from communication with the indicator. Thus the draft in the flue will be in in communication with one end of the indicator while the other end will be in communication with the atmosphere, so the differences in pressures can be noted.

If it is desired to ascertain the difference between the drafts or pressures in the flue and fire box, the valve 19 is given another turn of 90°, bringing the same into the position shown in Figure 4, in which the air vent is cut off from communication with the indicator tube, while the furnace pipe 16 is in communication with the left hand end of the indicator tube and the flue pipe 15 is in communication with the right hand end of the indicator tube as can be readily seen. The difference in draft or pressure will then be indicated by the movement of the liquid in the indicator, which movement is caused by the unequal pressures exerted on the ends of the columns of liquid in the indicator tube.

And if it is desired to ascertain the draft or pressure in the furnace, the valve is given another quarter turn bringing the same into the position shown in Figure 7 in which the flue is cut off from communication with the indicator, the air cup or vent being in communication with the left hand end of the indicator and the furnace pipe being in communication with the right hand end of the indicator tube as can be readily seen by the position of the ducts 27 and 30. Thus the draft or pressure of the furnace against the right hand end of the indicator tube will be balanced by atmospheric pressure at the other end of the tube.

While a certain mode of operation has been ascribed to the valve 19, it is apparent that the valve may be rotated in a reverse direction, or through any desired angle to bring the desired port of the furnace into communication with the indicator. It is characteristic of this invention that only a single valve is needed to obtain the various relations of parts, and that by putting indicia upon the front face of the cap 22, to indicate the different positions of the valve, a very simple and speedy method of adjustment is obtained which eliminates the errors that frequently arise where several valves are used, by operating a wrong one. A gauge constructed according to this invention is far simpler, more efficient, and more readily adjustable, than other gauges now in use.

I am aware that numerous details of construction may be varied through a wide range without departing from the principles of this invention, and I therefore do not purpose limiting the patent granted otherwise than necessitated by the prior art.

I claim as my invention:

1. A valve mechanism comprising a housing having a pair of openings therein adapted to be communicated with the ends of an indicator of a draft gauge, a plurality of additional openings and an air vent and a valve in said housing adapted to close said additional openings and bring said air vent into communication with the ends of the indicator whereby said indicator may be adjusted.

2. A valve mechanism comprising a housing having a pair of openings therein adapted to be communicated with the ends of the indicator tube of a draft gauge, an air vent and a plurality of additional openings adapted to be communicated with pressure to be measured, a valve in said housing operable for connecting said additional openings with the indicator tube and for closing said additional openings and bringing said air vent into communication with both ends of the indicator tube.

In testimony whereof I have hereunto subscribed my name.

LEWIS M. ELLISON.